3,127,317
PROCESS FOR TREATING ORGAN TISSUE AND PRODUCT OBTAINED THEREBY
Rudolf Kern, Neustadt an der Weinstrasse, Germany, assignor to Rhein-Chemie G.m.b.H., Mannheim-Rheinau, Germany
No Drawing. Filed Jan. 23, 1962, Ser. No. 168,226
7 Claims. (Cl. 167—74)

My invention generally relates to organ preparations and is particularly directed to a new and improved process for processing and preserving tissue from animal organs for physiological and therapeutic purposes.

This application is a continuation-in-part application of my application Serial No. 596,401, filed on July 9, 1956, for "Process of Treating Therapeutically Utilizable Organ Preparations," now abandoned.

For the purpose of preserving animal tissue for extended periods it has been suggested prior to my invention to dry fresh tissue obtained from animal organs and to store the dried tissue under predetermined conditions. The prior art processes for preserving animal tissue in dried condition are based on the observation, well known in the art, that fresh undried tissue obtained from animals cannot be preserved for any extended period, even if the tissue is stored in frozen condition. This is so because fresh tissue in undried condition tends to decompose rapidly due to the presence of biologically and chemically active substances and environmental factors. Several processes have been suggested for the purpose of drying and thus preserving tissue obtained from animal organs. Besides rather primitive drying procedures, a number of more complex drying processes have been developed wherein protective measures are taken for the purpose of retaining the therapeutically valuable characteristics and components of the tissue. Thus, the art has developed to a stage wherein it has become possible to a certain extent to preserve the valuable components and characteristics of the tissue without the use of chemical preserving agents and merely by refining the physical drying conditions. According to more recent developments in this field, vacuum drying, particularly at low temperatures, has been adopted in the art, a process which is generally referred to as "freeze-drying."

Although present day drying techniques constitute an important advance forward in the art of preserving animal tissue, the usual freeze-drying processes have still serious drawbacks. One disadvantage of the customary freeze-drying procedure is that it requires a relatively long period of time, and in fact the drying procedure proper may take several days which, of course, renders the drying treatment excessively expensive. Moreover, the expenditure in apparatus is considerable. It has also been reliably ascertained that effective preservation of the animal tissue is contingent on very low drying temperatures and the lower the drying temperature, the better the preservation. The particular temperature to be chosen is also a function of the sensitivity of the particular tissue in question, and the more sensitive the tissue, the lower the temperature to be chosen.

It is, accordingly, a primary object of my invention to overcome the disadvantages and drawbacks of prior art drying procedures for preserving tissue originating from animal organs.

It is also an object of my invention to provide a process for treating tissue emanating from animal organs wherein the biological and therapeutical activity of the tissue is effectively preserved.

Another object of my invention is to improve on known drying techniques for preserving animal tissue by providing a pretreatment stage for enhancing the therapeutical and physiological activity of the final product.

A further object of my invention is to treat highly sensitive and readily decomposable animal tissue in such a manner that the physiologically and therapeutically beneficial activity of such tissue is reliably preserved for extended periods of time.

Still another object of my invention is to provide a process for preparing and preserving animal tissue which may be carried out in a simple and relatively rapid manner and without requiring elaborate expenditure.

Generally, it is an object of my invention to improve on the art of preserving animal tissue for therapeutic purposes as hitherto practiced.

Briefly, and in accordance with my invention, I have ascertained that, as compared to prior art preservation procedures, I can considerably enhance the biological activity and the therapeutical effect of tissue preparations obtained from animal organs if, prior to the freeze-drying proper, I adopt the following pretreatment procedure:

I first freeze animal tissue as soon as possible after slaughtering and removal from the respective organ to a temperature of below $-30°$ C. The tissue, during this freezing treatment, should preferably not come into contact with the freezing agent. Once the tissue has reached a temperature below $-30°$ C. I rapidly raise the temperature of the tissue by at least $25°$ C., but not above $0°$ C., and immediately thereafter I start the vacuum freeze-drying according to the prior art procedure.

I have ascertained that the first freezing step to a temperature of below $-30°$ C. gives particularly advantageous results if the tissue is frozen to a temperature value between $-50$ and $-90°$ C.

The subsequent temperature increase by at least $25°$ C. again yields best results if the temperature is raised to a value of between about $-15$ to $0°$ C.

All process steps described by me hereinbefore should be carried out under sterile conditions, thereby avoiding the necessity for subsequent sterilization of the final tissue preparation.

While my invention is applicable to the preparation and preservation of tissue obtained from any kind of animals, I have ascertained that for practical purpose, primarily mammals such as pigs, sheep, goats and bovine animals or their fetuses in the latter stages of development come into consideration. However, it will be realized that birds or fish may also be used as donors. In this connection, I should emphasize that the expressions "tissue" or "tissue from animal organs" as used herein are deemed to include cell tissue proper which is obtained from animal organs or fetal animal organs and also preparations obtained from body fluids of animals. Animal organs which may be used are for example placenta, ovary, testis, heart, liver, kidney, thyroid gland, hypophysis, thalamus, hypothalamus, pancreas, spleen, bone marrow etc.

I have reliably ascertained by extensive experiments carried out by me that the initial freezing step followed by the rapid temperature increase of at least $25°$ C. results in a more effective preservation of animal tissue than if the animal tissue is merely subjected to ordinary freeze-drying. Thus, the pretreatment referred to preserves the biological and therapeutical activity and effect of the animal tissues to a substantial extent.

The organ material or tissue to be preserved is first surgically removed from the slaughtered animals as soon as practical and under sterile conditions whereafter the organ portions in question are comminuted and placed into sterile vessels or containers. The freezing treatment at a temperature below $-30°$ C. is thereafter immediately initiated while avoiding contact between tissue and cooling agent. I should emphasize at this point that particularly advantageous results are obtained if the cooling is carried out instantaneously and rapidly so that a sudden temperature drop will result. Of course, many cooling agents or substances are known in the art which will accomplish such a result. The choice of the particular substance or agent will be dependent on the desired temperature to be obtained. However, I may mention that liquified gases such as air, nitrogen, oxygen, propane, butane, pentane, isopentane and the like gaseous media are suitable for the purpose in question. Also, freezing mixtures composed of organic solvent such as for example, alcohol and ketone and solid carbon dioxide i.e. Dry Ice may be used.

The thus frozen tissue may be stored in frozen condition, preferably below $-30°$ C., for considerable periods without affecting the activity of the final dry tissue preparation. From a practical point of view, it will sometimes be necessary to store the pretreated frozen tissue preparation dependent on the schedule of the plant and the availability of apparatus for further processing of the tissue.

Prior to the subsequent heating procedure, the vessels containing the frozen tissue preparation may be flushed or rinsed with a sterile gas composed of inert gases such as, for example, nitrogen or argon. The purpose of such flushing treatment is to remove the oxygen in the vessels. Of course, the temperature of the gas has to be suitably chosen so as not to affect the frozen condition of the tissue preparation. However, it should be emphasized that the flushing treatment, for the purpose of removing the oxygen, is not imperative for a successful performance of the inventive process as the therapeutic and biological activity of many tissue preparations is not necessarily affected by the presence of oxygen. However, tissues from certain organs are extremely sensitive to oxidation and in such instances I prefer to remove the oxygen in the vessels prior to the subsequent temperature increasing procedure.

The tissue preparation-containing vessels are thereafter rapidly heated so as to increase the temperature by at least $25°$ C. I have ascertained that the success of my inventive process is to a certain degree contingent on a rapid and uniform heating of all portions of the preparations. For this reason, I prefer to subject the frozen tissue preparation to the heating treatment in a thin layer. The temperature raising period should preferably not exceed 10 minutes and according to a preferred embodiment of my inventive process, the heating should be completed in about between 1 and 3 minutes. The heating may be carried out by any means known per se, as for example by high frequency or infrared heating, or by introducing a germ-free or sterilized gas flow of suitable temperature into the vessels. Such gas flow can, for example, consist of inert gases such as noble gases or nitrogen. The extent of the sudden temperature increase to the temperature at which the drying of the tissue preparation takes place is largely dependent on the water content of the tissue and/or on the tendency of the tissue to retain water. Other factors which have to be considered in connection with the temperature raise are the vacuum value during the subsequent drying procedure, that is the suction capacity of the vacuum pump to be used. However, it is important for the purpose of obtaining the desired effect that the temperature is raised by at least $25°$ C. As previously mentioned, I have ascertained that particularly advantageous results are obtained if the tissue preparation is brought to a temperature of about $-15$ to $0°$ C. whereafter the drying of the tissue preparation is effected at such temperature.

The tissue containing vessels are then immediately evacuated upon reaching the drying temperature. The drying proper may be effected under ordinary vacuum ($10^2$ to $10^{-2}$ mm./Hg) or in a high vacuum ($10^{-2}$ to $10^{-5}$ mm./Hg). I have found it to be advantageous if the steam which is formed during the vacuum treatment is rapidly withdrawn and condensed at a location away from the tissue preparation. Of course, the steam can also be chemically or physically bound.

With a view to facilitating the drying during the vacuum treatment, auxiliary drying substances may be introduced into the system which, however, should not contact the tissue preparation. These auxiliary agents may comprise the customary drying agents, such as for example, phosphorus pentoxide, magnesium perchlorate, silica gel, sulfuric acid, calcium oxide, calcium sulfate and the like water absorbents.

According to a further modification of my invention, I have established that the drying temperature during the vacuum treatment may be varied after at least a portion of the water originally contained in the tissue material has been removed by the vacuum treatment. Thus, my experiments have established that after about one-fourth of the moisture content of the tissue preparation has evaporated, the drying temperature may be lowered to a value below $-15°$ C. Further, after the original moisture content has decreased to about 10% only, the temperature may be raised to values up to $+30°$ C. By varying the drying conditions in this manner, an optimum preservation effect can be obtained for each particular tissue, depending on the organ from which it emanates. Thus, the activity of certain tissue is more effectively preserved if the final stage of the drying is effected at low temperatures while higher temperatures again may be more suitable with regard to tissues emanating from different organs. Thus, for example, certain tissue may tend to lose some of its activity if the drying procedure is too protracted, and therefore an increase of the drying temperature to a plus value of up to $30°$ C. will expedite the removal of residual moisture, thereby shortening the total drying time.

I have also established that the final moisture content of the dried tissue preparations preferably should not exceed 5% and advantageously should be below 1%. After completed drying, the tissue preparations are filled, under sterile conditions, into evacuated ampules which are then sealed in customary manner whereafter the ampules may be stored for an indefinite period of time.

All the various steps hereinbefore described, starting with the removal of the tissue material from the donor animal up to the sealing of the ampules should be carried out under sterile conditions.

The inventive pretreatment of the tissue preparations prior to the drying proper considerably enhances the biological and therapeutical activity of the tissue preparations as compared to that of tissue preparations which have been merely dried in accordance with the prior art procedures. It will be realized that my invention pretreatment may be carried out in a simple manner without requiring elaborate apparatus.

The invention will now be described by several examples, it being understood, however, that these examples are given by way of illustration and not by way of limitation, and that many changes in choice of raw materials and process conditions in general may be effected without affecting in any way the scope and spirit of this invention as recited in the appended claims.

EXAMPLE I

The fetus of a healthy cow was removed prior to calfing in sterile manner and by Caeserian section. The fetus was killed and its liver was rapidly removed in surgical manner and under sterile conditions. For experimentation purposes several portions of 5 grams each of the liver were rapidly comminuted under sterile conditions. The 5 gram portions of the comminuted liver were filled into sterile wide-necked Jena flasks with a capacity of 250 ml. Several such flasks, each containing 5 grams of comminuted liver, were prepared. The flasks with the liver therein were thereafter immersed under shaking into a freezing mixture, and in this manner, the liver in the flasks was rapidly brought to the desired freezing temperature below −30° C. and froze to the wall of the respective flasks in the form of a thin layer. The actual freezing temperatures in this example were −70° C. and −35° C.

The liver preparations could be stored in this frozen condition for extended periods of time without affecting their biological or therapeutical activity.

The flasks were thereafter placed into a vacuum vessel which was fitted with means for adjusting the temperature and which could be controllably evacuated. The freezing temperature in the flasks was maintained during the transfer into the vacuum vessel. The vacuum vessel, and thus the flasks therein, were thereafter flushed with nitrogen which had previously been dried and sterilized. The temperature of the nitrogen was about the same as that of the frozen tissue. In this manner, the air in the apparatus was replaced by inert nitrogen. The flushing of the apparatus was followed by the heat treatment previously referred to. This heat treatment was effected by raising the temperature of the apparatus in a rapid manner so that the tissue preparation was substantially uniformly heated within a period of 1 to 2 minutes to temperatures of −5° C. or −15° C. The heating was effected in dielectric manner. As soon as the temperatures of −5° C. respectively −15° C. had been obtained, vacuum was applied to the vessel and the subsequent vacuum treatment was effected at a pressure of $10^{-1}$ to $10^{-2}$ mm./Hg. After a drying period of about 5 hours at −5° C. the water content of the test samples had been reduced to below 5%. The same result was obtained by carrying out the vacuum drying at a temperature of −15° C., but in that event, it took 6 hours to lower the moisture content in the preparation to below 5%.

Upon completion of the drying, the preparations were examined with regard to their biological activity. This was done by employing the well known method of Warburg as described in Biochemische Zeitschrift, vol. 166, p. 386, of 1925. This method is based on measuring the amount of oxygen in cubic centimeter absorbed per gram of dry substance within a period of 180 minutes. This determines the breathing intensity of the preparations and thus the biological activity.

For comparison purposes and to establish the biological activity according to Warburg and the therapeutical activity as described hereinafter, the following preparations were prepared:

(1) (Prior art): Fetal calf liver was frozen in the manner described above and was subsequently subjected to freeze-drying at a temperature of −70° C. During the drying, the temperature was permitted to rise slowly until finally, after almost complete drying, the tissue material had reached a temperature value of 0° C.

(2) (Prior art): Fetal calf liver was frozen in the manner described above at −70° C. and was subsequently subjected to a two-step drying procedure as disclosed by H. Proom in "Freezing and Drying," report of a symposium held June 1951, pp. 118–119. The two-step drying process as described in this publication relates to the drying of bacteria cultures. The sample was kept over night under vacuum at a temperature of −70° C., and in the presence of phosphorus pentoxide. Subsequently and within a time period of 2 hours, the sample was brought to room temperature and was thereafter completely dried within 7 days at room temperature and under vacuum.

The preparations treated in accordance with this application were dried under the following conditions:

(3) *Fetal calf liver preparation.*—The first cooling temperature was −70° C., while the freeze-drying temperature was −15° C.

(4) *Fetal calf liver preparation.*—The first cooling temperature was −35° C., while the freeze-drying temperature was −5° C.

(5) *Fetal calf liver preparation.*—The first cooling temperature was −35° C., and the freeze-drying temperature was −5° C.; after removal by the vacuum drying of about one-third of the water contained in the preparation, the drying temperature was lowered to −35° C.

The following table lists the drying conditions and the results of the Warburg tests:

*Table I*

| Test No. | Organ | Freezing Temp., °C. | Drying Temp. | Warburg test (oxygen absorbed by 1 g. of dry substance in ccm.) | | | | Increase as compared to ordinary freeze-drying only, percent |
|---|---|---|---|---|---|---|---|---|
| | | | | 60′ | 120′ | 180′ | total | |
| 1 | Fetal calf liver | −70 | Ordinary freeze-drying | 2.5 | 5.5 | 8.5 | 16.5 | ±0 |
| 2 | do | −70 | −70° C. (thereafter room temp.). | 0 | 0 | 0 | | |
| 3 | do | −70 | −15° C. | 3 | 14 | 22 | 39 | +136 |
| 4 | do | −35 | −5° C. | 6 | 16 | 24 | 46 | +178 |
| 5 | do | −35 | final drying at −35° C. upon removal of ⅓ of water. | 4 | 14 | 19 | 37 | +124 |

For the purpose of testing the therapeutic activity of the liver preparations, I used the bromosulfalein test as described by Rosenthal and White in the Journal of the American Medical Association, vol. 84, of 1925, p. 1112. The test as described in this publication was, however, slightly modified.

I proceeded as follows: I first caused a liver damage similar to the liver cirrhosis of human beings in the liver of rats by injecting the rats repeatedly with carbon tetrachloride. The liver activity prior to, during and after the action of the carbon tetrachloride was tested by determining the amount of bromosulfalein which was still present in the blood of the rats 15 minutes after the injection.

For each test 20 mg./kg. of bromosulfalein were injected into the vena femoralis of the rats at the inner side of the thigh after blocking the blood circulation. The blood, for testing purposes, was obtained from the rats by amputating a vertebra of the tail 15 minutes after injection. For the purpose of determining the bromosulfalein level, I admixed 0.2 ml. of serum with 6 ml. of a 0.3% NaOH solution. The photometric determination was carried out with a Lange spectral colorimeter at the absorption maximum of bromosulfalein. By using a standard curve the reading obtained was calculated and converted to the amount in percent of bromosulfalein which is present in the blood immediately after injection.

100 rats having an average bromosulfalein number of 11.4 were injected during 4½ weeks with 0.31 ml./kg. of carbon tetrachloride twice weekly. The carbon tetrachloride was diluted with sesame oil. 57 of the 100 rats were still living on the 31st test day. The average bromosulfalein number of the living rats was 25.3.

I then divided the rats into three groups, each group embracing 18 rats. In doing so, I made sure that each of the three groups contained animals having disease symptoms of about the same level.

Test group I: Untreated control animals.

Test group II: The rats were injected on the 32nd and 34th treatment day, each with 20 mg./kg. of a liver preparation which was prepared in accordance with test 1 (prior art).

Test group III: The rats were injected on the 32nd and 34th treatment day, each with 20 mg./kg. of a liver preparation which was prepared according to test 4.

Upon the first injection of the liver tissue preparation, further injection of carbon tetrachloride was discontinued for 16 days. On the 48th day, all rats were further injected with 0.31 ml./kg. of carbon tetrachloride in order to examine the reestablishment of the liver function by introducing a further damage-causing factor. The results of the liver test are reproduced in Table 2:

*Table 2*

| Treatment, Day | Test Group I—Control animals | | |
| --- | --- | --- | --- |
| | Number of Rats | Bromosulfalein Number | Death Rate, percent |
| 32nd | 18 | 25.5 | |
| 48th | 10 | 29.3 | 44 |
| 58th | 3 | 37.6 | 83 |

| Treatment, Day | Test Group II—Injection of liver preparation of test 1, freeze-dried in usual manner | | |
| --- | --- | --- | --- |
| | Number of Rats | Bromosulfalein Number | Death Tate, percent |
| 32nd | 18 | 25.1 | |
| 48th | 10 | 22.0 | 44 |
| 58th | 6 | 24.1 | 67 |

| Treatment, Day | Test Group III—Injection of liver preparation of test 4, prepared according to this invention | | |
| --- | --- | --- | --- |
| | Number of Rats | Bromosulfalein Number | Death Rate, percent |
| 32nd | 18 | 25.3 | |
| 48th | 11 | 19.6 | 39 |
| 58th | 8 | 22.7 | 56 |

Table 2 clearly indicates that the liver preparations prepared in accordance with this invention have an improved therapeutical activity as compared to liver preparations which have been preserved by the ordinary prior art freeze-drying procedure. Thus, by examining the table, it will be noted that the injection of a liver preparation which has been freeze-dried in the ordinary prior art manner (group II) causes a bromosulfalein number of 24.1 on the 58th day of treatment, while the death rate was 67%. By contrast, the bromosulfalein number of rats treated with the inventive preparation (group III) was only 22.7, while the death rate was 56%. This, of course, means that the bromosulfalein number has been reduced by 5.8%, while the death rate has gone down by 16.4% as compared to the values obtained in accordance with the prior art preparation.

EXAMPLE II

The testicles were removed from a young and healthy calf. The removal of the testicles was effected under sterile conditions. The testicles were thereafter processed in the same manner as described in connection with Example I. The drying conditions as well as the results of the Warburg test are reproduced in Table 3:

*Table 3*

| Test No. | Organ | Freezing Temp., °C. | Drying Temp. | Warburg test (oxygen absorbed by 1 g. of dry substance in ccm.) | | | | Increase as compared to ordinary freeze-drying only, percent |
| --- | --- | --- | --- | --- | --- | --- | --- | --- |
| | | | | 60' | 120' | 180' | Total | |
| 6 | Testicle of young calf. | −70 | Ordinary freeze-drying. | 9.5 | 17 | 24 | 50.5 | 0 |
| 7 | do | −55 | −10° C | 18 | 29 | 51 | 98 | 94 |
| 8 | do | −70 | −4° C | 21 | 32 | 53 | 106 | 110 |

The therapeutical activity of preparations 6 and 8 was measured by: (A) determining the growth acceleration of the genitals of infant rats after the injection of the preparation, and (B) reestablishment of the potentia generandi of senile rats as a measure for the activity of the preparation.

In examining the therapeutic acivity in accordance with test A, I used as an additional control and for comparison purposes a preparation which had been prepared in accordance with the teachings of U.S. Patent 1,979,124. The drying treatment embraced the following steps:

(1) Freezing of the testis tissue, which was rapidly removed from the donor animal by the action of alcohol which had previously been cooled down to a temperature of −60° C.

(2) Dehydration of the comminuted tissue at a temperature of −18° C. The comminution of the tissue had been effected at a temperature of −60° C. while the dehydration was effected under pressure.

(3) Renewed cooling of the conglomerated mass or cake which had been formed at −18° C. at a pressure of 2000 atm. The renewed cooling was continued until a temperature value of −60° C. had been reached.

(4) Mixing of the preparation with pre-cooled silica gel.

(5) Final drying at a temperature of −18° C. in a vacuum desiccator.

(6) Removal of the silica gel by sifting the product through a sieve of suitable mesh.

TEST A 48 infantile male mice having an average weight of 7 to 8 grams were divided into four test groups, each consisting of twelve mice.

Test group I: Untreated control animals.

Test group II: The mice were injected each with 20 mg./kg. of preparation No. 6 which had been admixed with Ringer solution to obtain a slurry.

Test group III: The mice were injected each with 20 mg./kg. of preparation No. 8. The preparation had been mixed with Ringer solution to obtain a slurry.

Test group IV: The animals were injected each with 20 mg./kg. of a preparation prepared in accordance with U.S. Patent 1,979,124. Again, the preparation had been admixed with Ringer solution to obtain a slurry.

All mice were killed on the 14th day after the injection by breaking their necks. The glandulae vesiculosae were rapidly removed in surgical manner and were immediately wrapped into a thin aluminum foil of known weight.

This procedure was adopted in order to prevent any water loss prior to the weighing. The organs were individually weighed and the average weight was calculated.

The results are tabulated in Table 4:

*Table 4*

|  | Test Group I | Test Group II | Test Group III | Test Group IV |
|---|---|---|---|---|
| Number of Mice | 12 | 12 | 12 | 12 |
| Average weight of Mice........g.. | 15.0 | 14.7 | 14.8 | 15.0 |
| Weight of Glandulae Vesiculosae mg.. | 5.1 | 10.8 | 14.1 | 11.5 |

It will be seen from the table that the injection of preparation No. 8, that is a testis preparation prepared in accordance with this invention, caused an acceleration of the genital maturing process which is expressed by an increased weight of the glandulae vesiculosae. The weight increase as compared with the weight after injection of a testicle preparation according to a prior art freeze-drying procedure was 30.5%. Compared with the weight of the glandulae vesiculosae after injecting a testis preparation prepared according to U.S. Patent 1,979,124, the weight increase was 22.6%.

TEST B

The potentia generandi of four male Wister rats which had an age of slightly more than two years was tested by placing each of the male rats into a separate cage with two female rats capable of engendering. The male rats were allowed to cohabit with the female rats for 4 days and the test was repeated five times. The conception rate of the female rats was then determined.

Thereafter, two of the male rats were injected in intramuscular manner with a slurry of 20 mg./kg. of preparation No. 6 as admixed with Ringer solution.

The other two male rats were injected in intramuscular manner with a slurry of 20 mg./kg. of preparation No. 8 admixed with Ringer solution.

After an interval of 8 days, the rats were again brought together with two female rats respectively in order to determine any improvement in the potentia generandi. The results are tabulated in Table 5:

*Table 5*

| Treatment | Test Day | Conception Rat 1 | Conception Rat 2 | Conception Rat 3 | Conception Rat 4 |
|---|---|---|---|---|---|
| Before injection | 1–4 | − | − | − | − − − − |
| Do | 5–8 | − + | − | − | − − − − |
| Do | 9–12 | − | − | − | − + − − |
| Do | 13–16 | − | − | − | − + − − |
| Do | 17–20 | − | − | − | − − − − |
| Injection | 21 | Preparation No. 6, 20 mg./kg. | | Preparation No. 8, 20 mg./kg. | |
|  | 22–28 | Interval | | Interval | |

| Treatment | Test Day | Conception Rat 1 | Conception Rat 2 | Conception Rat 3 | Conception Rat 4 |
|---|---|---|---|---|---|
| After injection | 29–32 | + − | − − | + + | + − |
| Do | 33–36 | + + | + − | + + | + + |
| Do | 37–40 | + − | + − | + − | + − |
| Do | 41–44 | − − | − − | + − | − − |
| Do | 45–48 | − | + − | + − | + − |

In analyzing Table 5, it will be noted that prior to the injection of the testis preparation, the conception frequency was only 7.5%, while after injection of preparation No. 6, the conception frequency rose to 35% and after injection of preparation No. 8, to 55%.

While specific embodiments of the invention have been described in detail to illustrate the application of the inventive principles, it wil be understood that the invention may be embodied otherwise without departing from such principles.

What is claimed is:

1. A process of preserving animal tissue which comprises freezing fresh animal tissue obtained from a donor animal to a temperature below −30° C., thereafter substantially uniformly raising the temperature of the tissue within about between one to ten minutes by at least 25° C. but not above 0° C. and immediately thereafter drying the animal tissue under vacuum, said process being carried out under sterile conditions.

2. In a process of preserving and drying fresh animal tissue wherein animal tissue is dried at low temperature under vacuum, the improvement which comprises first freezing said animal tissue prior to said vacuum drying to a temperature below −30° C. immediately after the animal tissue has been obtained from a donor animal and thereafter substantially uniformly raising the temperature of the tissue within about one to three minutes by at least 25° C. but not above 0° C.

3. A process of preserving tissue from donor animals which comprises surgically removing tissue from freshly killed donor animals, comminuting said tissue, immediately thereafter freezing the tissue to a temperature below −30° C. without contact between the tissue and the freezing agent, thereafter substantially uniformly raising the temperature within ten minutes by at least 25° C. but not above 0° C., then, without previous removal of cell constituents, drying said tissue at about the raised temperature in a vacuum of $10^2$ to $10^{-5}$ mm. Hg until a moisture content below 5% has been obtained and thereafter sealing the animal tissue in air-tight containers, said process being carried out under sterile conditions.

4. A process of preserving tissue from donor animals which comprises surgically removing tissue from freshly killed donor animals, comminuting said tissue, immediately thereafter freezing the tissue to temperatures between about −50 and −90° C. without contact between the tissue and the freezing agent, thereafter substantially uniformly raising the temperature within ten minutes to temperatures between about −15 and 0° C., then, without previous removal of cell constituents, drying said tissue at about the raised temperature in a vacuum of $10^2$ to $10^{-5}$ mm. Hg and in the presence of moisture absorbing agents, but without contact between said tissue and said moisture absorbing agents until a moisture content below 1% has been obtained and thereafter sealing the animal tissue in air-tight containers, said process being carried out under sterile conditions.

5. A process of preserving tissue from donor animals which comprises surgically removing tissue from freshly killed donor animals, comminuting said tissue, immediately thereafter freezing the tissue in a container to temperatures between about −35 and −70° C. without contact between the tissue and the freezing agent, removing oxygen by flushing the container with an inert gas, thereafter raising the temperature within about three minutes to temperatures between −15 and −4° C., then, without previous removal of cell constituents, drying said tissue at about the raised temperature in a vacuum of $10^2$ to $10^{-5}$ mm. Hg and in the presence of moisture absorbing agents, but without contact between said tissue and said moisture absorbing agents, until at least one fourth of the water content has been removed, then lowering the temperature below −15° C. and drying at that new temperature until a moisture content below 5% has been obtained and thereafter sealing the animal tissue in air-tight containers, said process being carried out under sterile conditions.

6. A process of preserving tissue from donor animals which comprises surgically removing tissue from freshly killed donor animals, comminuting said tissue, immediately thereafter freezing the tissue to temperatures between −50 and −90° C. without contact between the tissue and the freezing agent, then storing the frozen tissue at said temperature for a predetermined period of time, thereafter raising the temperature within about ten minutes to temperatures between −15 and 0° C., then, without previous removal of cell constituents, drying said tissue at about the raised temperature in a vacuum of $10^2$ to $10^{-5}$ mm. Hg and in the presence of moisture absorbing agents, but without contact between said tissue and said moisture absorbing agents until at least about 90% of the water content has been removed, then raising the temperature not more than +30° C. and drying the animal tissue at this raised temperature until a moisture content below 1% has been obtained and thereafter sealing the animal tissue in airtight containers, said process being carried out under sterile conditions.

7. The product obtained by the process of claim 1.

References Cited in the file of this patent

UNITED STATES PATENTS 1,979,124    Tival _____ Oct. 30, 1934